(12) United States Patent
Cheluvaraja et al.

(10) Patent No.: US 10,303,800 B2
(45) Date of Patent: May 28, 2019

(54) SYSTEM AND METHOD FOR OPTIMIZATION OF AUDIO FINGERPRINT SEARCH

(71) Applicant: Interactive Intelligence Group, Inc., Indianapolis, IN (US)

(72) Inventors: Srinath Cheluvaraja, Carmel, IN (US); Ananth Nagaraja Iyer, Carmel, IN (US); Felix Immanuel Wyss, Zionsville, IN (US)

( * ) Notice: Subject to any disclaimer, the term of this patent is extended or adjusted under 35 U.S.C. 154(b) by 466 days.

(21) Appl. No.: 14/636,474

(22) Filed: Mar. 3, 2015

(65) Prior Publication Data

US 2015/0254338 A1    Sep. 10, 2015

Related U.S. Application Data

(60) Provisional application No. 61/947,834, filed on Mar. 4, 2014.

(51) Int. Cl.
*G06F 17/00* (2019.01)
*G06F 17/30* (2006.01)
*G10L 25/51* (2013.01)

(52) U.S. Cl.
CPC ........ *G06F 17/30743* (2013.01); *G10L 25/51* (2013.01)

(58) Field of Classification Search
CPC ................................................ G06F 17/30743
See application file for complete search history.

(56) References Cited

U.S. PATENT DOCUMENTS

| 5,825,644 A | 10/1998 | Yeap |
| 7,421,376 B1 | 9/2008 | Caruso et al. |
| 8,681,950 B2 | 3/2014 | Vlack et al. |

(Continued)

FOREIGN PATENT DOCUMENTS

| JP | 2013534645 A | 9/2013 |
| WO | 2003/009277 A2 | 1/2003 |
| WO | 2015134452 A1 | 9/2015 |

OTHER PUBLICATIONS

Bastian Leibe et al., Efficient Clustering and Matching for Object Class Recognition, Sep. 2006, BMVA press, pp. 1-10.*

(Continued)

*Primary Examiner* — Augustine K. Obisesan
*Assistant Examiner* — Lahcen Ennaji

(57) ABSTRACT

A system and method are presented for optimization of audio fingerprint search. In an embodiment, the audio fingerprints are organized into a recursive tree with different branches containing fingerprint sets that are dissimilar to each other. The tree is constructed using a clustering algorithm based on a similarity measure. The similarity measure may comprise a Hamming distance for a binary fingerprint or a Euclidean distance for continuous valued fingerprints. In another embodiment, each fingerprint is stored at a plurality of resolutions and clustering is performed hierarchically. The recognition of an incoming fingerprint begins from the root of the tree and proceeds down its branches until a match or mismatch is declared. In yet another embodiment, a fingerprint definition is generalized to include more detailed audio information than in the previous definition.

16 Claims, 4 Drawing Sheets

(56) References Cited

U.S. PATENT DOCUMENTS

| | | | | |
|---|---|---|---|---|
| 8,947,595 B1* | 2/2015 | Tucker | ............... | H04N 21/231 |
| | | | | 348/445 |
| 2005/0091062 A1 | 4/2005 | Burges et al. | | |
| 2006/0242193 A1 | 10/2006 | Dunning | | |
| 2007/0055500 A1* | 3/2007 | Bilobrov | ........... | G06F 17/30743 |
| | | | | 704/217 |
| 2008/0163288 A1* | 7/2008 | Ghosal | ............... | H04N 7/1675 |
| | | | | 725/31 |
| 2009/0225994 A1* | 9/2009 | Topchy | ............... | G10L 25/48 |
| | | | | 381/56 |
| 2010/0153838 A1 | 6/2010 | Arnold et al. | | |
| 2011/0022638 A1* | 1/2011 | Jiang | ............... | G06F 17/30743 |
| | | | | 707/797 |
| 2011/0153050 A1* | 6/2011 | Bauer | ............... | G10L 19/018 |
| | | | | 700/94 |
| 2011/0307085 A1 | 12/2011 | Selby et al. | | |
| 2013/0034291 A1* | 2/2013 | Minin | ............... | G06K 9/00 |
| | | | | 382/137 |
| 2014/0193027 A1* | 7/2014 | Scherf | ............... | G06F 17/30784 |
| | | | | 382/100 |

OTHER PUBLICATIONS

Haitsma, Jaap and Antonius Kalker, "A Highly Robust Audio Fingerprinting System", International Symposium on Music Information Retrieval (ISMIR) 2002, pp. 107-115.

International Search Report and Written Opinion of the International Searching Authority dated Jun. 17, 2015 in related international application PCT/US 15/18429 filed Mar. 3, 2015.

Extended European Search Report for Application No. 15758494.7, dated Sep. 9, 2017, 9 pages.

Chilean First Office Action for Application No. 02219-2016, dated Feb. 6, 2018, 5 pages.

Chilean Office Action for Application No. 201602219, dated May 14, 2018, 6 pages.

Japanese Office Action with English Translation for Application No. 2016-550721, dated Feb. 19, 2019, 8 pages.

* cited by examiner

SYSTEM AND METHOD FOR OPTIMIZATION OF AUDIO FINGERPRINT SEARCH

BACKGROUND

The present invention generally relates to telecommunications systems and methods, as well as speech recognition. More particularly, the present invention pertains to audio fingerprinting.

SUMMARY

A system and method are presented for optimization of audio fingerprint search. In an embodiment, the audio fingerprints are organized into a recursive tree with different branches containing fingerprint sets that are dissimilar to each other. The tree is constructed using a clustering algorithm based on a similarity measure. The similarity measure may comprise a Hamming distance for a binary fingerprint or a Euclidean distance for continuous valued fingerprints. In another embodiment, each fingerprint is stored at a plurality of resolutions and clustering is performed hierarchically. The recognition of an incoming fingerprint begins from the root of the tree and proceeds down its branches until a match or mismatch is declared. In yet another embodiment, a fingerprint definition is generalized to include more detailed audio information than in the previous definition.

In one embodiment, a method of searching for audio fingerprints stored in a database within an audio fingerprint detection system is presented, the method comprising the steps of: dividing known audio files into frames that overlap; extracting audio fingerprints for each frame from the known audio files; archiving the audio fingerprints into the database; and comparing and classifying an incoming unknown audio stream wherein said comparing and classifying is based on the extent of the match of the fingerprints of the unknown audio stream with the fingerprints archived in the database.

In another embodiment, a method of searching for audio fingerprints stored in a database within an audio fingerprint detection system is presented, the method comprising the steps of: dividing known audio files into frames that overlap; extracting audio fingerprints for each frame from the known audio files; archiving the audio fingerprints into the database, wherein each fingerprint is archived at a plurality of resolutions; and comparing and classifying an incoming unknown audio stream, wherein said comparing and classifying is based on the extent of the match of the fingerprints of the unknown audio stream with the fingerprints archived in the database, and wherein the matching is performed based on resolution.

DETAILED DESCRIPTION

Figure 1:
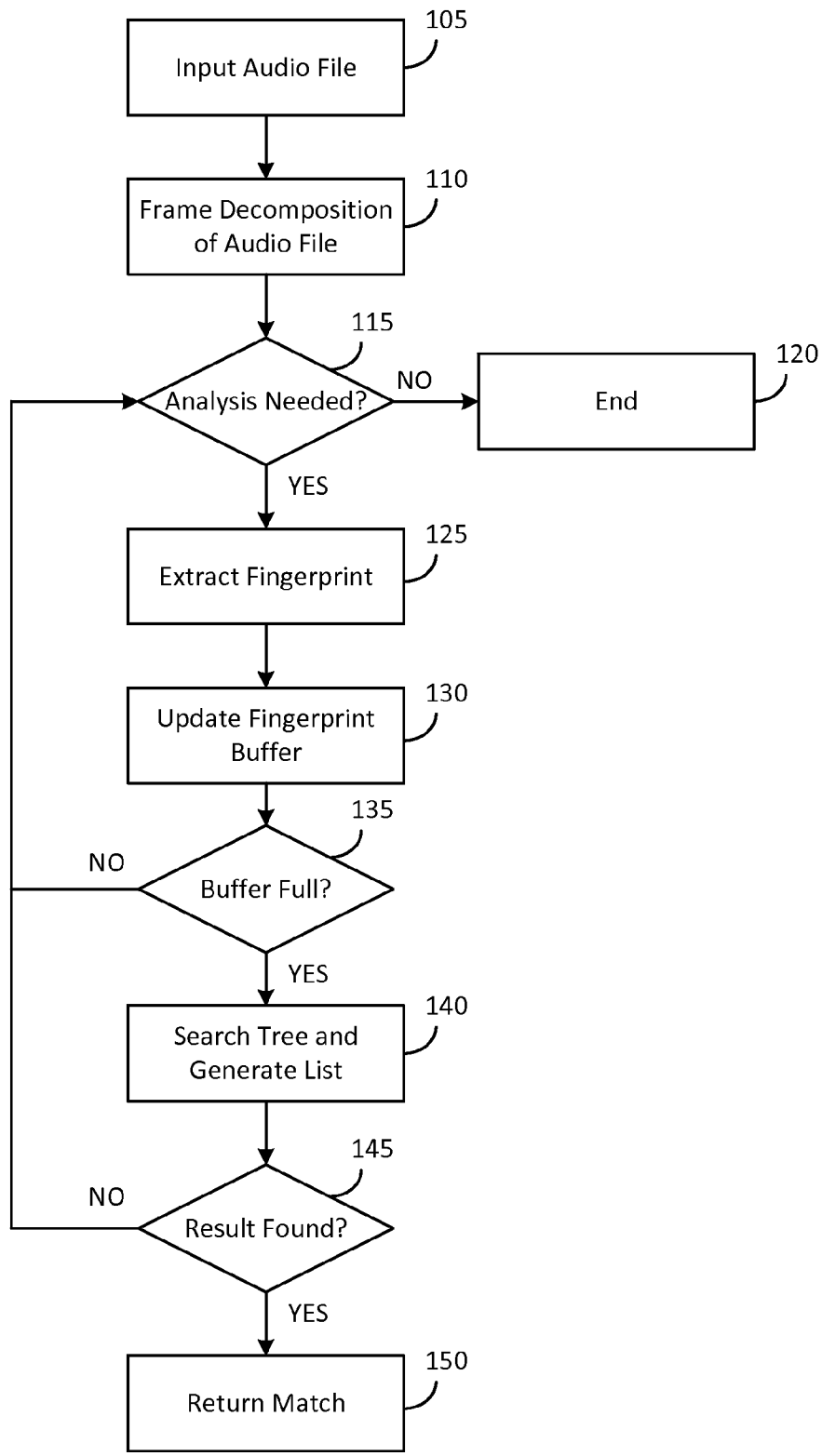
FIG. 1 is a flowchart illustrating a process for an embodiment of an audio fingerprint system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

An audio fingerprint may be defined as a small memory footprint. It is a low dimensional representation of the continuous values taken by an audio frame comprising music, speech, or other characteristics, and must be robust with respect to changes in scale (volume, minor shifts and drop-off, distortions introduced by codecs, and passage of data over network routers).

The Philips algorithm (as described in the following reference: Haitsma, Jaap, and Antonius Kalker, "A Highly Robust Audio Fingerprinting System", International Symposium on Music Information Retrieval (ISMIR) 2002, pp. 107-115) may be used to construct a binary fingerprint which is augmented with a matching binary mask that labels the informative part of the fingerprint, greatly improving the signal to noise ratio of the fingerprinting system. Further information on this process may be found in U.S. Pat. No. 8,681,950, issued Mar. 25, 2014, titled "System and Method for Fingerprinting Datasets", inventors Kevin Vlack and Felix I. Wyss. The fingerprint comprises a 16 bit binary stream for each audio frame corresponding to energy and time derivatives of perceptual filter bank values (17 perceptual filter banks and 16 consecutive differences). Eight successive fingerprints are combined into a fingerprint block (128 bits and 160 ms in time) which is the basic unit used for fingerprint identification.

Audio fingerprint detection systems may be used for recognizing and classifying audio files into different types for diverse applications. Such applications may include music album identification, artist identification, and telephone call classification into subtypes (e.g., live speaker, answering machine, network messages, busy tones), to name a few non-limiting examples. These systems divide each audio file into overlapping frames and extract a fingerprint for each frame. The extracted fingerprints are archived in a database against which an incoming unknown audio stream is compared and classified depending on the extent of the match of its fingerprint with the files present in the archive.

The manner of storage of the fingerprint archive may have an effect on the search times for matching and retrieving fingerprints. Retrieval of a matching fingerprint from the archive must also be fast and has direct influence on the manner of storing and representing the fingerprints.

Audio fingerprinting systems should be capable of searching large sets of available fingerprints. Thus, the systems can benefit from optimized search approaches that reduce search times and improve real-time performance of fingerprint detection by reducing false positives (wrong matches) and false negatives (misses).

FIG. 1 is a flowchart illustrating a process for an embodiment of an audio fingerprint system. The overall flow of a fingerprinting system may be seen generally in FIG. 1. In an embodiment, the sliding buffer comprises fingerprints of 160 ms in length. However, the embodiments discussed herein may be adapted to other fingerprint definitions using spectral peaks and two dimensional images stored using wavelet coefficients, among other adaptations.

In operation 105, an audio file is input. Control passes to operation 110 and the process 100 continues.

In operation 110, frame decomposition is performed on the audio file. For example, the incoming audio file may be decomposed into non-overlapping data frames, each of which is 20 ms (e.g., 160 samples, assuming 8 KHz sampling) in size, and every complete frame is analyzed. Control passes to operation 115 and the process 100 continues.

In operation 115, it is determined whether or not the frames undergo analysis. If it is determined that the frames undergo analysis, control is passed to operation 125 and the process 100 continues. If it is determined that the frames do not need to undergo analysis, control is passed to operation 120 and the process 100 ends.

The determination in operation 115 may be based on any suitable criteria. For example, the completion of the frames is examined. If a frame is incomplete, especially the last fragment of the frame, that frame is skipped and analysis is not performed.

In operation 125, a fingerprint is extracted. The fingerprint may comprise a 16 bit digital fingerprint. In an embodiment, a digital fingerprint comprises a binary string representative of a chunk of audio and robust to small changes in volume and to the presence of noise. A set of masked bits may be used (as discussed in the Vlack patent previously mentioned) that provides this robustness. Control passes to operation 130 and the process 100 continues.

In operation 130, the buffer of the fingerprint is updated. In an embodiment, the fingerprint buffer stores the most recent eight audio frames that are needed to obtain a fingerprint block made up of 8 consecutive audio fingerprints. The fingerprint block is thus 128 bits in length and identifies 8 consecutive audio segments (160 ms). Control passes to operation 135 and the process 100 continues.

In operation 135, it is determined whether or not the buffer is full. If it is determined that the buffer is full, control is passed to operation 140 and the process 100 continues. If it is determined that the buffer is not full, control is passed back to operation 115 and the process continues.

The determination in operation 135 may be based on any suitable criteria. For example, once the buffer is full, the oldest element of the buffer is discarded to make way for the most recent audio fingerprint. This ensures that the buffer comprises the at least 8 fingerprints needed to form a complete fingerprint block. After the first 8 frames, the buffer is primed for continuous analysis until the last complete fingerprint is analyzed.

In operation 140, a fingerprint tree is searched and a list of candidate matches for the most recent fingerprint block is created. In an embodiment, the fingerprint tree that is searched may be constructed in the process further described below in FIG. 3. Previously generated candidate matches are also extended if it is determined that the current fingerprint block extends into an already existing one. Control passes to operation 145 and the process 100 continues.

In operation 145, it is determined whether or not a match can be identified. If it is determined that a match can be identified, control is passed to operation 150 and the search ends. If it is determined that a match cannot be identified, control is passed to back operation 115 and the process continues.

In an embodiment, the decision to declare a match is made after calculating the significance of the match which comprises the probability of the match occurring by chance. If this probability drops below a certain threshold, a result is declared. The significance of a match is calculated from the bit error rate (BER) which is assumed to follow a normal distribution. The BER may be calculated from the Hamming distance.

In operation 150, a match is returned and the process ends.

Figure 2:
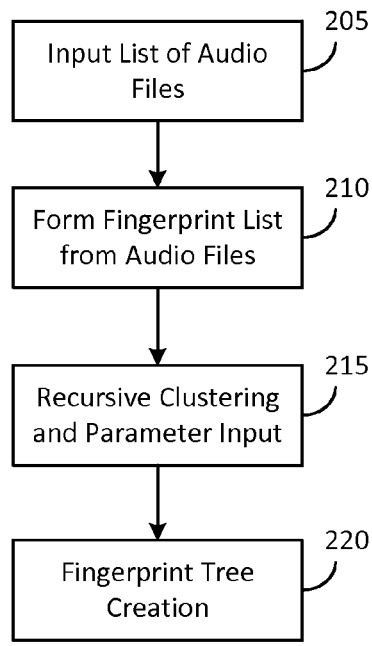
FIG. 2 is a flowchart illustrating an embodiment of a process for the creation of a fingerprint tree.

FIG. 2 is a flowchart illustrating an embodiment of a process for the creation of a fingerprint tree. The fingerprint tree may be searched in operation 140 of FIG. 1 for generating a list of result candidates.

In operation 205, a list of audio files is compiled. For example, the audio files may be archived and extracted using the processes previously described in the Haitsma and Vlack references. Control passes to operation 210 and the process 200 continues.

In operation 210, a fingerprint list is formed from the audio files. In an embodiment, each audio file may be partitioned into four equal segments and the fingerprint blocks from the beginning of each segment are accumulated into a list. This procedure is further detailed in the previously mentioned Vlack patent. Control passes to operation 215 and the process 200 continues.

In operation 215, recursive clustering of the fingerprint list is performed with chosen tree parameters as input. In an embodiment, clustering may be performed using a nearest neighbor k-means clustering using the Hamming distance as a distance measure. In an embodiment, the fingerprint mask is not used at this stage of clustering. The cluster centroid of a set of fingerprints is chosen to be the bit sequence that represents the majority bit value at each bit position. Clusters are assigned to different branches of a tree and the cluster construction may be repeated until a tree of a particular depth is obtained. The tree depth and branching factors are chosen appropriately to obtain a certain level of performance. The input parameters comprise the branching factor at each cluster (or node) and the maximum tree depth. Control is passed to operation 220 and the process 200 continues.

In operation 220, the fingerprint tree is generated and the process ends. In an embodiment, tree formation may be discontinued if cluster size becomes very small. The tree need not be well-balanced and can have any shape although well-balanced trees may be more advantageous. Pointers or labels to each audio file are passed down the tree at creation time to allow for quick access to individual files as the fingerprint list becomes more randomly shuffled during the clustering process. In an embodiment, tree construction occurs offline and does not affect real-time performance of fingerprint detection.

Figure 3:
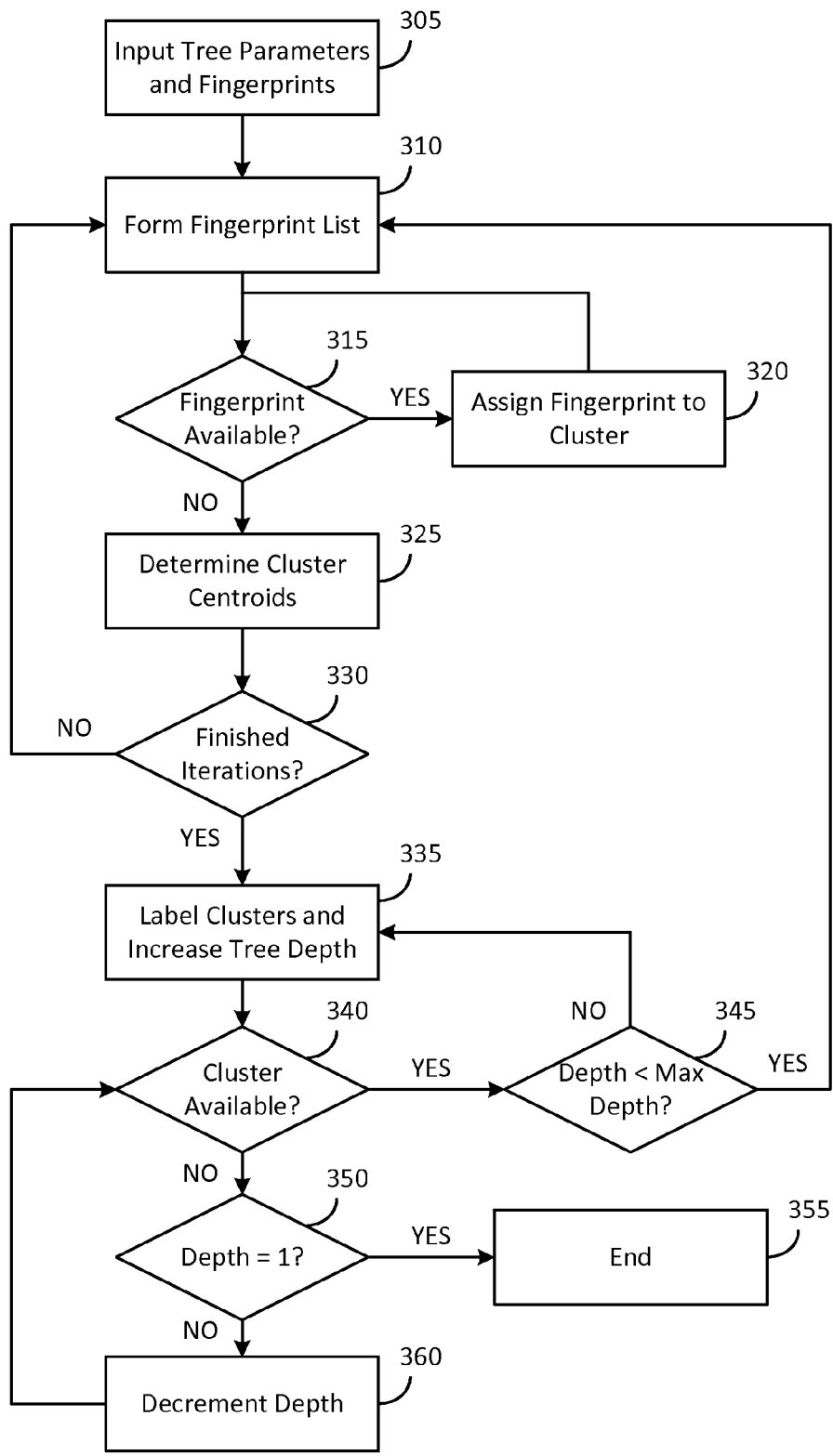
FIG. 3 is a flowchart illustrating an embodiment of a process for clustering.

FIG. 3 is a flowchart illustrating an embodiment of a process for clustering. Clustering may occur at single or multiple resolutions for the creation of the fingerprint tree in operation 215 of FIG. 2. In an embodiment, the branching factor and the maximum depth are the only parameters required to build the tree. Because audio fingerprints are randomly distributed to a good approximation, the clustering operation represents a tiling of the entire fingerprint set. Only fingerprints in a particular tile and its immediate neighbors are grouped into clusters. The result of FIG. 3 is a fingerprint tree such that fingerprints similar to each other form clusters at the nodes of the tree. Each cluster is recursively broken down until the tree has a certain maximum depth.

In operation 305, tree parameters and fingerprints from a database are input. In an embodiment, tree parameters are chosen for a given fingerprint set by adjusting them for desired levels of accuracy and search speed. Control passes to operation 310 and the process 300 continues.

In operation 310, a fingerprint list is formed from the audio files. Each audio file is partitioned into four equal segments and the fingerprint blocks from the beginning of each segment are accumulated into a list. This procedure is further detailed in the previously mentioned Vlack patent. Control passes to operation 315 and the process 300 continues.

In operation 315, it is determined whether or not a fingerprint is available. If it is determined that a fingerprint is available, control is passed to operation 320 and the process 300 continues. If it is determined that a fingerprint is not available, control is passed to operation 325 and the process 300 continues.

The determination in operation 315 may be based on any suitable criteria. For example, determining whether a fingerprint is available may be done by iterating through the list generated in operation 310.

In operation 320, the fingerprint is assigned to a cluster by calculating the Hamming distance from cluster centroids and picking the one nearest to it. Control passes back to operation 315 and the process 300 continues.

In operation 325, cluster centroids are determined. In an embodiment, the centroid of a set of fingerprints is the binary equivalent of its average and consists of the most frequently occurring binary value at each fingerprint location in a given cluster. The cluster centroids are determined from the clusters created at the end of operation 315. Control passes to operation 330 and the process 300 continues.

In operation 330, it is determined whether or not iterations are finished. If it is determined that iterations are finished or reached, control is passed to operation 335 and the process 300 continues. If it is determined that iterations are not finished or reached, control is passed back to operation 310 and the process 300 continues.

The determination in operation 330 may be made based on any suitable criteria. For example, the maximum number of iterations may be predetermined. When this number is obtained, control passes to operation 335. Each new iteration repeats the process with the same fingerprint list as before but with the most recently calculated cluster centroids. Cluster centroids may be chosen randomly from the initial fingerprint set and the number of clusters to form is referred to as the branching factor.

In operation 335, clusters are labeled and the tree depth is increased. In an embodiment, maximum tree depth parameters may be chosen appropriately to obtain a certain performance level. A list of clusters is formed and k-means clustering is applied to the contents of each cluster. This procedure recursively breaks down a list of clusters into smaller clusters forming a tree and stops until a certain specified maximum depth is reached. Control passes to operation 340 and the process 300 continues.

The determination in operation 340 may be made based on any suitable criteria. In an embodiment, the list of clusters is iterated through to look for available clusters.

In operation 345, it is determined whether the depth of the tree is less than the maximum depth. If it is determined that the depth of the tree is less than the maximum depth, control is passed back to operation 310 and the process 300 continues. If it is determined that the depth of the tree is not less than the maximum depth, control is passed back to operation 335 and the process 300 continues.

The determination in operation 345 may be made based on any suitable criteria. In an embodiment, every time a cluster from an existing one or from the start is formed, its depth is increased by one. The depth of the fingerprint list before tree construction is zero and every time a given list is broken down to clusters each child's depth increases by one. In an embodiment, the cluster at the bottom of the tree has the maximum depth.

In operation 350, it is determined whether or not the depth is equivalent to one. If the depth is equivalent to one, control is passed to operation 355 and the process 300 ends. If the depth is not equivalent to one, controlled is passed to operation 360 and the process 300 continues.

The determination in operation 350 may be made based on any suitable criteria. In an embodiment, the process stops after the last child of the root has been processed and this has a depth of one. This represents the last cluster at the very top of the tree.

In operation 360, the depth of the tree is decremented. In an embodiment, the decrement may be done by one. This process corresponds to climbing up the tree by one step and searching the next cluster at that level. Control is passed back to operation 340 and the process 300 continues.

In an embodiment of the multiresolution approach, each fingerprint is stored at a plurality of resolutions. In an embodiment, at least two resolutions are used. One resolution may be higher and the other resolution lower, such as 16 bits and 2 bits, for example.

In an embodiment, the tree may be first branched by clustering the fingerprints at low resolution (e.g., 2 bit corresponding to differences from 3 perceptual filter banks), and then storing the individual branches containing fingerprints at a higher (16 bit) resolution. These are further divided into smaller clusters if needed.

In an embodiment of the recognition step, each incoming fingerprint is extracted at low and high resolutions. The lower resolution fingerprint is matched with the node centroid as previously described and used to identify the cluster to which it belongs. The high resolution fingerprint match is then performed within the appropriate cluster(s). At higher resolutions, the fingerprint mask may be used to calculate the BER. Construction of the multiresolution tree is offline and does not affect real-time performance. In another embodiment, fingerprints at several resolutions (such as 2, 4, and 16 bits) can be used to construct hierarchical trees. Resolutions may be chosen to obtain a certain level of performance.

Figure 4:
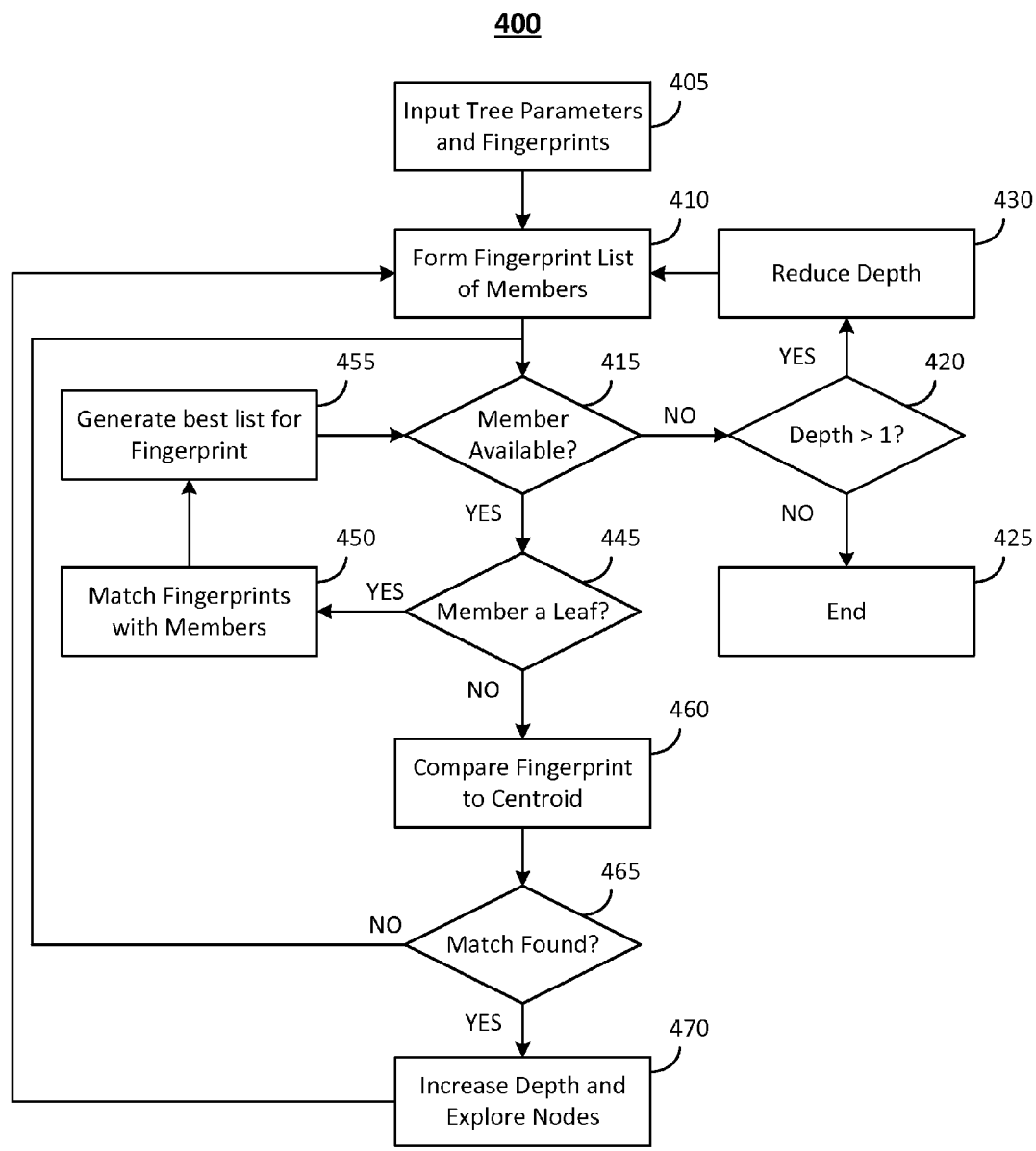
FIG. 4 is a flowchart illustrating an embodiment of a process for fingerprint recognition.

FIG. 4 is a flowchart illustrating an embodiment of a process for fingerprint recognition. In an embodiment, the recognition process is for a fingerprint block comprising 128 bits. In an embodiment, a preexisting tree with an additional threshold parameter for skipping a cluster is necessary. The search begins from the top and continues downward until a leaf, the lowest member of the tree, is reached. In an embodiment, the search is organized as a depth first search in which all the children at a particular node are searched before moving to the next child. Thresholds may be chosen appropriately to obtain a certain performance level.

In operation 405, tree parameters and fingerprints from the database are input. In an embodiment, tree parameters are chosen for a given fingerprint set by adjusting them for desired levels of accuracy and search speed. Control passes to operation 410 and the process 400 continues.

In operation 410, a fingerprint list is formed. In an embodiment, an incoming (unknown) fingerprint is matched with the members at the current depth of a fingerprint tree. This depth is initially set to 1 (which corresponds to the lowest value but highest level) of the tree. Control passes to operation 415 and the process 400 continues.

In operation 415, it is determined whether or not members are available. If it is determined that a member is available, control is passed to operation 445 and the process 400 continues. If it is determined that a member is not available, control is passed to operation 420 and the process 400 continues.

The determination in operation 415 may be made based on any suitable criteria. For example, determining whether members are available may be done by iterating through the list generated in operation 410.

In operation 420, it is determined whether or not the depth of the tree is greater than one. It if is determined that the depth is greater than one, control is passed to operation 430 and the process 400 continues. If it is determined that the depth is not greater than one, control is passed to operation 425 and the process ends.

The determination in operation 420 may be made based on any suitable criteria. In an embodiment, each member of the tree is a cluster (node) and each cluster has a depth between 1 and the maximum value. After searching all the members with depth 1, the tree is fully searched and there is nothing further to search.

In operation 430, the depth of the search position is reduced. Control passes to operation 410 and the process 400 continues.

In operation 445, it is determined whether or not the member is a leaf. If it is determined that the member is a leaf, control is passed to operation 450 and the process 400 continues. If it is determined that the member is not a leaf, control is passed to operation 460 and the process 400 continues.

The determination in operation 445 may be made based on any suitable criteria. For example, a leaf may be defined as a node that is not broken into sub-clusters and hence has no child nodes. A tree node stores each fingerprint at the desired resolutions. In multiple resolution trees, the tree nodes store each fingerprint at a plurality of resolutions.

In operation 450, the fingerprint is matched with all the members of the leaf. In an embodiment, fingerprints inside a leaf node are checked by applying the mask defined in the previously mentioned Vlack patent. In an embodiment, the BER rate is calculated only for the masked bits. The highest resolution fingerprint is only matched after applying the corresponding mask at the leaves of the tree. The fingerprint resolution used for searching a cluster that is not a leaf varies with tree depth. Control passes to operation 455 and the process 400 continues.

In operation 455, a list of candidate matches is generated for the fingerprint. Control passes back to operation 415 and the process 400 continues.

In operation 460, the fingerprint is compared to the centroid. In an embodiment, the fingerprint distance from the centroid of the node is calculated and the resulting value is compared with a threshold. Control passes to operation 465 and the process 400 continues.

In operation 465, it is determined whether or not a match has been found. If it is determined that match has not been found, control is passed to operation 415 and the process 400 continues. If it is determined that a match has been found, control is passed to operation 470 and the process 400 continues.

The determination in operation 465 may be made based on any suitable criteria. In an embodiment, the centroid-fingerprint distance is determined and compared to a threshold to determine matches.

In operation 470, the depth of the tree is increased and the child node contents are explored. In an embodiment, the calculated Hamming distance is examined. If the centroid-fingerprint distance falls below a threshold, all child nodes are explored in turn. The Hamming distance, which may be defined as the number of cumulative toggle operations to match two binary strings is implemented using high-speed XOR and popcount routines. If the centroid-fingerprint distance exceeds the threshold, all the child nodes are skipped. Control is passed back to operation 410 and the process 400 continues.

The method previously mentioned in Haitsma only measures directional differences of successive perceptual filter bank amplitudes over successive time instants. It does not measure the actual values. The actual values of these amplitudes are recorded by maintaining parallel sets of binary values for different strengths. For example, a 1 bit resulting from a positive difference (or 0 bit from negative) could be further detailed as a 0 or 1 depending on the difference value ranges. Depending on the level of detail retained, additional parallel bit streams are generated along with their respective masks that are calculated in the same way as described in the previously mentioned Vlack patent. If two fingerprints have a Hamming distance that is below the BER, then the Hamming distance between the parallel detailed bit streams is measured to confirm or reject the match at the next level of detail.

In the multiple resolution approach, each node of the tree stores fingerprints at two or more resolutions. The search process starts from the top level by matching fingerprints at the top nodes at lowest resolution and using progressively higher resolution at greater depths. Highest resolution matches are performed only at the leaf nodes. The incoming fingerprint will also have to be available in two or more resolutions. Multiple resolution trees can get quite complex when several resolutions are present but trees with just two resolutions (2,16 or 4,16) are quite effective in this approach. The steps in the process 400 are unchanged with the only difference at operation 460, where the centroid comparison is done at a resolution depending on the tree depth. The input parameters and fingerprints from operation 405 need to be available at multiple resolutions which reduces the total number of available fingerprints and automatically reduces the search space without affecting accuracy adversely.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computerized method of searching for audio fingerprints stored in a database within an audio fingerprint detection system, the method comprising the steps of:
   a. dividing known audio files into frames that overlap;
   b. extracting audio fingerprints for each frame from the known audio files, each audio fingerprint comprising a plurality of values extracted at least at a first resolution and at a second resolution, the second resolution having a higher resolution than the first resolution;
   c. archiving the audio fingerprints into the database; and
   d. comparing and classifying an incoming unknown audio stream wherein said comparing and classifying is based on the extent of the match of the fingerprints of the unknown audio stream with the fingerprints archived in the database, the database comprising a fingerprint tree comprising a plurality of nodes, each node of the plurality of nodes being associated with:

a cluster of similar fingerprints in accordance with a Hamming distance; and a centroid corresponding to an average of the similar fingerprints of the cluster, wherein the matching of fingerprints comprises:
   i. computing, using the Hamming distance, a fingerprint distance between a plurality of first resolution values of a fingerprint of the fingerprints of the unknown audio stream and the centroid of a node;
   ii. comparing a plurality of second resolution values of the fingerprint of the fingerprints of the unknown audio stream with child nodes of the node in response to determining that the fingerprint distance satisfies a threshold, each of the child nodes being associated with a sub-cluster of fingerprints of the cluster of the node;
   iii. repeating steps (i) and (ii) until a node without child nodes is reached;
   iv. applying a mask to check the fingerprints within the node reached in step (iii); and
   v. returning matches to the system.

2. The method of claim 1, wherein the frames have a length of 20 ms.

3. The method of claim 1, wherein the archiving of step (c) further comprises:
   a. assigning the fingerprints into clusters;
   b. assigning the clusters into branches of the fingerprint tree; and
   c. repeating steps (a) and (b) until a desired depth is obtained of the fingerprint tree.

4. The method of claim 1, wherein the centroid comprises a frequently occurring binary value at each fingerprint location in the cluster.

5. The method of claim 1, wherein the threshold comprises directional differences of successive perceptual filter bank amplitudes over successive instants.

6. The method of claim 1, wherein the threshold comprises directional differences of successive perceptual filter bank amplitude values.

7. The method of claim 6, wherein the values are recorded by maintaining parallel sets of binary values for different strengths.

8. A computerized method of searching for audio fingerprints stored in a database within an audio fingerprint detection system, the method comprising the steps of:
   a. dividing known audio files into frames that overlap;
   b. extracting audio fingerprints for each frame from the known audio files, each audio fingerprint comprising a plurality of values extracted at least at a first resolution and at a second resolution, the second resolution having a higher resolution than the first resolution;
   c. archiving the audio fingerprints into the database, wherein each fingerprint is archived at a plurality of resolutions; and
   d. comparing and classifying an incoming unknown audio stream, wherein said comparing and classifying is based on the extent of the match of the fingerprints of the unknown audio stream with the fingerprints archived in the database, the database comprising a fingerprint tree comprising a plurality of nodes, each node of the plurality of nodes being associated with:
      a cluster of similar fingerprints in accordance with a Hamming distance; and
      a centroid corresponding to an average of the similar fingerprints of the cluster,
   wherein the matching is performed based on resolution, and
   wherein the matching of fingerprints comprises:
      i. computing, using a Hamming distance, a fingerprint distance between a plurality of first resolution values of a fingerprint of the fingerprints of the unknown audio stream and the centroid of a node;
      ii. comparing a plurality of second resolution values of the fingerprint of the fingerprints of the unknown audio stream with child nodes of the node in response to determining that the fingerprint distance satisfies a threshold, each of the child nodes being associated with a sub-cluster of fingerprints of the cluster of the node;
      iii. repeating steps (i) and (ii) until a node without child nodes is reached;
      iv. applying a mask to check the fingerprints within the node reached in step (iii); and
      v. returning matches to the system.

9. The method of claim 8, wherein the frames have a length of 20 ms.

10. The method of claim 8, wherein the archiving of step (c) further comprises:
   a. assigning the fingerprints into clusters, wherein the fingerprints are assigned based on resolution;
   b. assigning the clusters into branches of the fingerprint tree; and
   c. repeating steps (a) and (b) until a desired depth is obtained of the fingerprint tree.

11. The method of claim 10, wherein the resolution comprises a high resolution and a low resolution.

12. The method of claim 11, wherein the high resolution comprises 16 bits.

13. The method of claim 11, wherein the low resolution comprises 2 bits.

14. The method of claim 8, wherein the centroid comprises a frequently occurring binary value at each fingerprint location in the cluster.

15. The method of claim 8, wherein the matching is performed starting with lower resolution fingerprints and progressing towards higher resolution fingerprints.

16. The method of claim 15, wherein a fingerprint mask is applied while performing the match at higher resolutions.

* * * * *